US008991537B2

(12) United States Patent
Snede et al.

(10) Patent No.: US 8,991,537 B2
(45) Date of Patent: Mar. 31, 2015

(54) COLLAPSIBLE HOOD BUMPER WITH RESET FEATURE

(71) Applicant: GM Global Technology Operations LLC, Detroit, MI (US)

(72) Inventors: Peter M. Snede, Macomb, MI (US); David M. Kileen, Bloomfield Hills, MI (US); David Waskie, Mountain Top, PA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/861,718

(22) Filed: Apr. 12, 2013

(65) Prior Publication Data

US 2014/0305725 A1   Oct. 16, 2014

(51) Int. Cl.
*B62D 25/10*   (2006.01)
*E05F 5/02*   (2006.01)
*B62D 25/12*   (2006.01)

(52) U.S. Cl.
CPC ................. *E05F 5/022* (2013.01); *B62D 25/12* (2013.01)
USPC ...................................................... 180/69.2

(58) Field of Classification Search
USPC .......... 180/69.2; 296/136.02, 187.03, 187.04, 296/193.11, 207; 411/392, 395–396, 417; 24/297, 453
See application file for complete search history.

(56) References Cited

U.S. PATENT DOCUMENTS

| 5,765,882 | A | * | 6/1998 | Trauscht et al. | 292/1 |
| 6,088,878 | A | * | 7/2000 | Antonucci et al. | 16/86 A |
| 6,119,306 | A | * | 9/2000 | Antonucci et al. | 16/86 A |
| 6,637,536 | B1 | * | 10/2003 | Polz et al. | 180/271 |
| 7,419,208 | B2 | * | 9/2008 | Sub | 296/193.09 |
| 7,469,955 | B2 | * | 12/2008 | Patterson et al. | 296/187.03 |
| 7,618,088 | B2 | * | 11/2009 | Bauer | 296/207 |
| 8,366,177 | B2 | * | 2/2013 | Prusmack | 296/168 |
| 8,424,629 | B2 | * | 4/2013 | Ralston et al. | 180/274 |
| 8,491,039 | B2 | * | 7/2013 | Mikutsu | 296/187.11 |
| 8,616,622 | B2 | * | 12/2013 | Davis et al. | 296/193.11 |

FOREIGN PATENT DOCUMENTS

| DE | 29910517 | A | 10/2000 |
| DE | 19957869 | A1 | 6/2001 |
| DE | 19745865 | C2 | 1/2003 |
| DE | 102005012774 | A1 | 9/2006 |
| DE | 102009013074 | A1 | 9/2010 |

* cited by examiner

*Primary Examiner* — John Walters
*Assistant Examiner* — James Triggs
(74) *Attorney, Agent, or Firm* — Quinn Law Group, PLLC

(57) ABSTRACT

A collapsible hood bumper for a vehicle having a hood generally includes a housing and a bumper head. The housing has a wall with an interior surface and an exterior surface, a base, and an opening defining an interior chamber. The bumper head has a main body, and is configured to receive a force from the hood of the vehicle. The bumper head is normally in an upright position in which the bumper head extends through the opening of the housing. However, the bumper head is collapsible from the upright position to a compressed position in which the bumper head is substantially disposed within the interior chamber of the housing. The bumper head is configured to be resettable from the compressed position to the upright position.

20 Claims, 3 Drawing Sheets

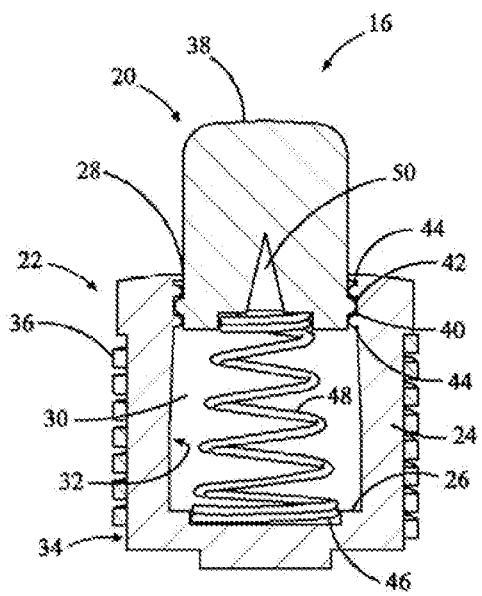
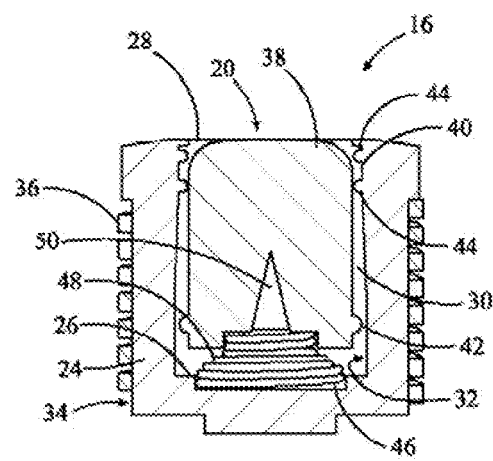
FIG. 3A                FIG. 3B
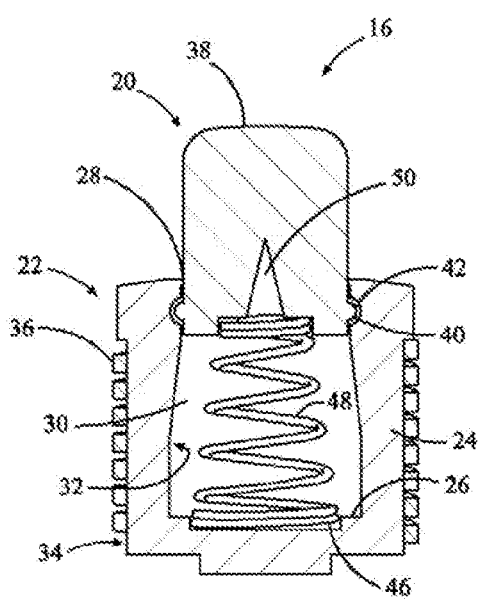
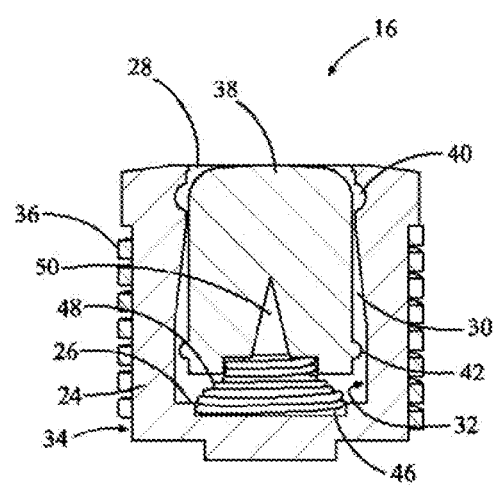
FIG. 4A                FIG. 4B

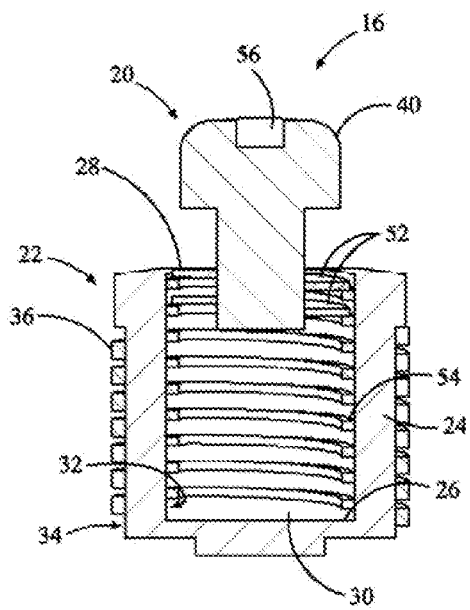 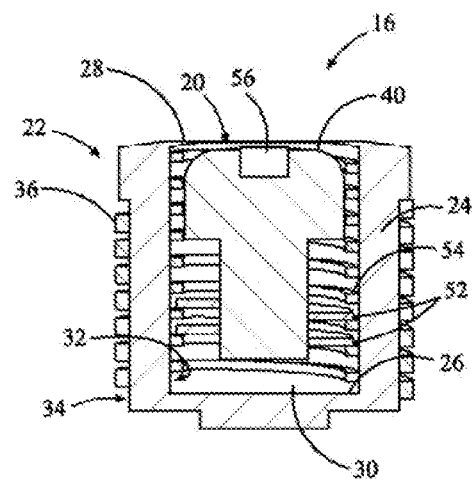
FIG. 5A  FIG. 5B
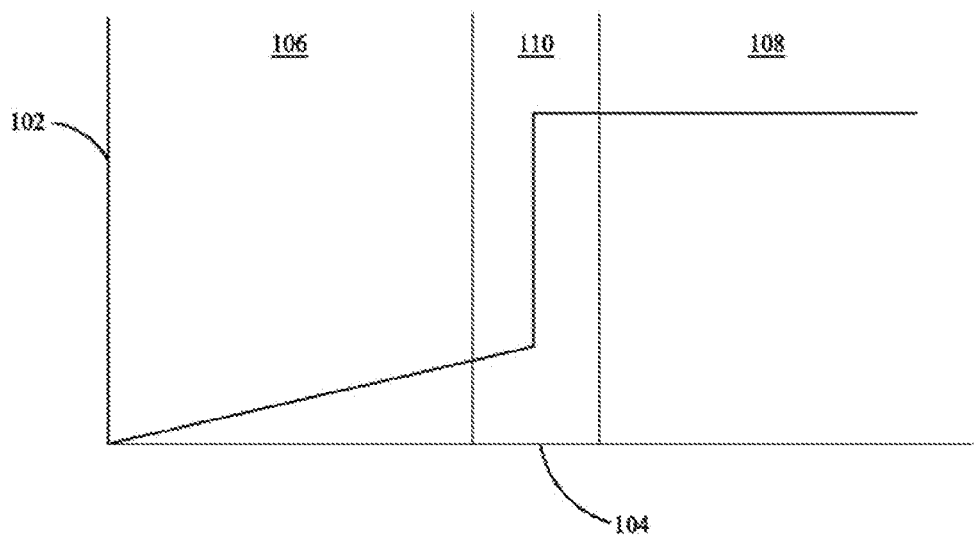
FIG. 6

COLLAPSIBLE HOOD BUMPER WITH RESET FEATURE

TECHNICAL FIELD

The present invention relates to a collapsible hood bumper with a reset feature for a vehicle with a hood.

BACKGROUND

Vehicles with a hood covering the engine compartment often include hood bumpers. The hood bumpers may serve as protection for other parts of the vehicle in such situations as over-slamming of the hood. In addition, when the hood is in a closed position, the hood bumpers may allow for deformation of the hood when a significant force is applied on it.

For such situations, programs such as regional NCAP (New Car Assessment Program) and Global Technical Regulation (GTR) have developed safety standards and criteria, including head impact criteria (HIC), that may require the hood to deform a sufficient distance to meet the criteria. To achieve this, some vehicles employ hood bumpers or brackets that break away when experiencing a significant amount of force, causing the hood to deform, and thereby providing a buffer before hitting hard components in the engine compartment.

SUMMARY

A collapsible hood bumper for a vehicle having a hood is provided. The hood bumper generally includes a housing and a bumper head. The housing has a wall, a base, and an opening that define an interior chamber. The wall has an interior surface and an exterior surface.

The bumper head has a main body, and is configured to receive a force from the hood of the vehicle. The bumper head is normally in an upright position in which the bumper head extends through the opening of the housing. The bumper head is collapsible from the upright position to a compressed position, in which the bumper head is substantially disposed within the interior chamber of the housing, when the force applied on the bumper head exceeds a predetermined magnitude. The bumper head is configured to be resettable from the compressed position to the upright position.

The housing may also include at least one channel along at least a portion of the interior surface of the wall, and the bumper head may also include at least one flange along at least a portion of the main body. The at least one flange may be configured to fit within the at least one channel such that the bumper head is maintainable in the upright position.

The collapsible bumper head may further include a spring that has a plurality of coils. The spring may be attached to the main body of the bumper head and to the base of the housing. The spring may be configured to allow the bumper head to be reset to the upright position from the compressed position.

In lieu of the at least one channel, the at least one flange, and the spring, the housing may include an internal thread defined by the interior surface of the wall, and the bumper head may include a bumper thread configured to engage with the internal thread such that the bumper head is unscrewable from the compressed position to the upright position. The bumper thread may be semi-rigid such that the bumper head is maintainable in the upright position and collapsible into the compressed position when the force applied exceeds the predetermined magnitude.

A vehicle is also provided. The vehicle includes an engine compartment, a hood configured to cover the engine compartment, at least one receiving hole located around the engine compartment and below the hood, and at least one collapsible hood bumper. The at least one collapsible hood bumper may be as described above, where the housing of the collapsible hood bumper is configured to engage with the at least one receiving hole such that the collapsible hood bumper is attached to the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIGS. 3A and 3B are schematic, cross-sectional views of one embodiment of the hood bumper of FIG. 2, with the bumper head in an upright position and in a compressed position, respectively;

FIGS. 4A and 4B are schematic, cross-sectional views of another embodiment of the hood bumper of FIG. 2, with the bumper head in an upright position and in a compressed position, respectively;

FIGS. 5A and 5B are schematic, cross-sectional views of yet another embodiment of the hood bumper of FIG. 2, with the bumper head in an upright position and in a compressed position, respectively; and FIG. 6 is a graph illustrating the relationship between the deflection of the bumper head of the hood bumper and the force applied on the bumper head.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1A:
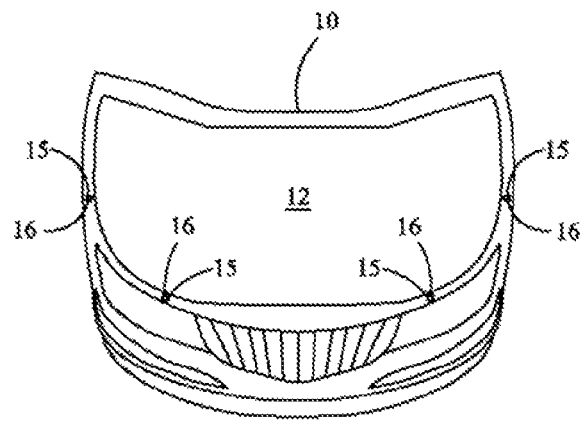
FIG. 1A is a schematic, top view of an engine compartment of a vehicle with hood bumpers.
Figure 1B:
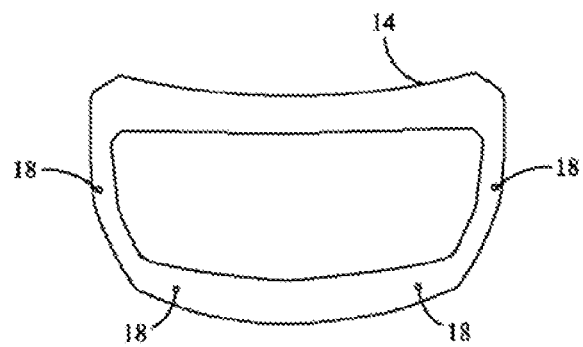
FIG. 1B is a schematic, bottom view of a hood of the vehicle illustrating contact points of the hood bumpers from FIG. 1A with the hood.

Referring to the drawings, wherein like reference numbers correspond to like or similar components wherever possible throughout the several figures, an engine compartment 12 of a vehicle 10 is shown in FIG. 1A, and the corresponding hood 14 for covering the engine compartment 12 is shown in FIG. 1B. The material of the hood 14 generally may be, but is not limited to, steel or aluminum. In addition, the slam type of the hood 14 may be, but is not limited to, a gas strut type or an abusive type. The vehicle 10 has receiving holes 15 around the engine compartment 12 and below the hood 14, and hood bumpers 16 configured to engage with the receiving holes 15 such that the hood bumpers 16 are attached to the vehicle 10. The hood bumpers 16 come into contact with the hood 14 at contact points 18 when the hood 14 is closed or being closed.

Figure 2:
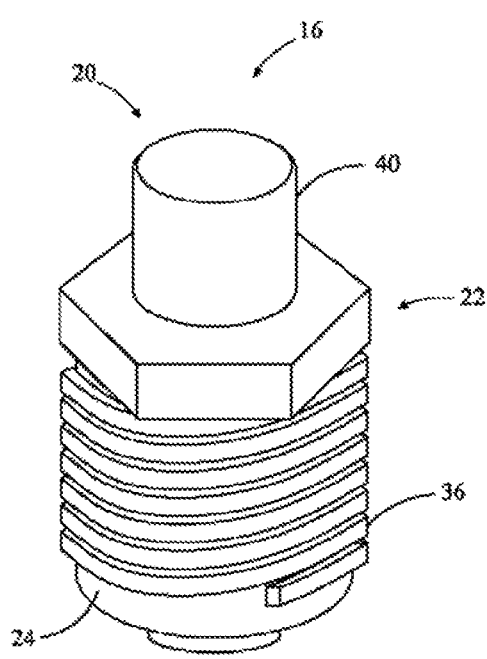
FIG. 2 is a schematic, perspective view of one of the hood bumpers of FIG. 1A, the hood bumper having a bumper head and a housing.

Referring now to FIG. 2, each hood bumper 16 generally includes a bumper head 20 and a housing 22. The bumper head 20 generally is configured to deflect when a force is applied from the hood 14, and to collapse after the force exceeds a predetermined magnitude or range, as depicted in the graph of FIG. 6 and described in more detail hereinafter. The force may be the result of over-slamming of the hood 14, or the result of an object striking the hood 14 at a high velocity, thereby generating a greater magnitude of force. In the situation of over-slamming of the hood 14, the hood bumpers 16 may act as shock absorbers to protect other components of the vehicle 10. In the situation of an object, particularly a large object, striking the hood 14, the collapsing of the bumper heads 20 allows for deformation of the hood 14 to better absorb the impact of the object striking the hood 14.

Referring now to FIGS. 3A and 3B, the housing 22 has a wall 24, a base 26, and an opening 28 that generally define an interior chamber 30. The wall 24 has an interior surface 32 and an exterior surface 34. The wall 24 may be tapered from the opening 28 toward the base 26, which may further the collapsing of the bumper head 20 into the interior chamber 30, as described in more detail hereinafter. The housing 22 may have an exterior thread 36 that enables the hood bumper 16 to be screwed into the corresponding receiving hole 15. In addition, the top of the housing 22 around the opening 28 may be hexagonal in shape, as depicted in FIG. 2, such that the hood bumper 16 may be screwed into the receiving hole 15 by a tool such as a wrench. The material of the housing 22 may be made of a rigid material, which may be, but is not limited to, plastic, metal, or the like.

The bumper head 20 generally includes a main body 38, and is made of an elastic or flexible material, which may be, but is not limited to, rubber. The bumper head 20 is configured to receive the force applied on it by the hood 14, as explained above. The bumper head 20 is normally in an upright position, in which the bumper head 20 extends through the opening 28 of the housing 22 as depicted in FIG. 3A, when the force applied to it is minimal. The bumper head 20 is collapsible into a compressed position, in which the bumper head 20 is substantially disposed within the interior chamber 30 of the housing 22 as depicted in FIG. 3B, from the upright position when the force exceeds the predetermined magnitude, as explained above.

To maintain the bumper head 20 in the upright position, the housing 22 may have a channel 40 along at least a portion of the interior surface 32 of the wall 24, and the bumper head 20 may have a flange 42 along at least a portion of the main body 38. The flange 42 is configured to fit within the channel 40. In another embodiment not shown, the channel 40 may be located along at least a portion of the main body 38 of the bumper head 20, and the flange 42 may be along at least a portion of the interior surface 32 of the wall 24.

The channel 40 may be formed by a pair of ribs 44 that may be substantially parallel to each other, with the flange 42 resting on the bottom rib 44. In another embodiment depicted in FIGS. 4A and 4B, the channel 42 may be formed within the wall 24. The size of the channel 40, and thus the ribs 44, as well as the flange 42, may be a factor in determining the relationship between the deflection of the bumper head 20 and the force applied on it, as depicted in FIG. 6. As such, the sizes may vary depending upon the material and/or slam type of the hood 16, as described above, and the desired predetermined magnitude of force to collapse the bumper head 20 from the upright position to the compressed position.

The hood bumper 16 may also have a spring 46 that has a plurality of coils 48. The spring 46 may be attached to the bottom of the bumper head 20 and to the base 26 of the housing 22. The spring 46 may allow the bumper head 20 to be reset from the compressed position to the upright position. In addition, the spring constant of the spring 46 also may be a factor in determining the relationship between the deflection of the bumper head 20 and the force applied on it. The spring constant may be adjusted based on the material and/or slam type of the hood 14 and the desired predetermined magnitude of force. The spring 46 may be tapered such that each coil 48 substantially fits within an adjacent coil 48 when the bumper head 20 is deflecting, and ultimately is in the compressed position. This may allow for maximum deflection of the bumper head 20 into the interior chamber 30.

The bumper head 20 may further include a notch 50 in the main body 38. The notch 50 may allow the main body 38 to collapse inwardly toward the notch when the force is applied to the bumper head 20, thereby furthering the collapsing of the bumper head 20 from the upright position to the compressed position. The size of the notch 50 may be another factor in determining the relationship between the deflection of the bumper head 20 and the force applied on it, and as such, may vary depending upon the material and/or slam type of the hood 14, as well as the desired predetermined magnitude of force.

Referring now to FIGS. 5A and 5B, another embodiment of the hood bumper 16 is shown. As with the other embodiments described above, the hood bumper 16 generally includes the bumper head 20 with the main body 40, and the housing 22, with the wall 24 having the interior surface 32 and the exterior surface 34, the base 26, and the opening 28 to define the interior chamber 30. The housing 22 may also have the external thread 36.

However, in lieu of the channel 40 and the flange 42 to maintain the bumper head 20 in the upright position, and the spring 46 for resetting the bumper head 20 to the upright position from the compressed position, the bumper head 20 may have a bumper thread 52, and the housing 22 may have an internal thread 54 defined by the interior surface 32 of the wall 24. The internal thread 54 generally is rigid, similar to the rest of the housing 22, as described above.

The bumper thread 52, however, is semi-rigid and semi-flexible. The semi-rigidity allows the bumper thread 52 to rest on the internal thread 54 to maintain the bumper head 20 in the upright position when no force or a minimal force is applied to it. On the other hand, the semi-flexibility allows the bumper thread 52 to bend when the applied force exceeds the predetermined magnitude such that the bumper head 20 may collapse from the upright position to the compressed position. Once in the compressed position, the bumper thread 52 is configured to engage with the internal thread 54 such that the bumper head 20 may be unscrewed and, therefore, reset to the upright position.

The size, configuration, and/or flexibility of the bumper thread 20 may be more factors in determining the relationship between the deflection of the bumper head 20 and the force applied on it, and as such, may vary depending upon the material and/or slam type of the hood 14, as well as the desired predetermined magnitude of force.

The bumper head 20 may further include a tool head opening 56 configured to receive a tool head of a tool, including, but not limited to, a screwdriver, a hex key, and the like. This allows the tool to be used to unscrew the bumper head 20 from the compressed position to the upright position, as explained above.

While not shown, it should be appreciated that the main body 40 of the bumper head 20 in FIGS. 5A and 5B also may have the notch 50 to further the collapsing of the bumper head 20 from the upright position to the compressed position.

Referring now to FIG. 6, a relationship between the deflection of the bumper head 20 (y-axis 102) and the force applied on it (x-axis 104) is illustrated. The first zone 106 represents the deflection of the bumper head 20 due to over-slamming, and the second zone 108 represents the deflection due to the impact of an object striking the hood 14 at a high velocity. In either scenario, the amount of force may vary depending upon the material and/or the slam type of the hood 14, as described above. Furthermore, in the scenario of an object striking the hood 14, the force may further be dependent upon other factors, such as the speed of the vehicle 10, the size of the object, and the like. The third zone 110 represents the range of forces at which the hood bumper 16 collapses. It should be appreciated that the first zone 106 and the second zone 108 may overlap such that the third zone 110 is within the first zone 106 and the second zone 108. More specifically, the bumper head 20 may collapse when the force applied on it is greater than the minimum force from the impact of the object against the hood 14, but is less than the maximum force from over-slamming of the hood 14.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A collapsible hood bumper for a vehicle having a hood, the collapsible hood bumper comprising:
   a housing having a wall, a base, and an opening defining an interior chamber, the wall having an interior surface and an exterior surface; and
   a bumper head having a main body, the bumper head being configured to receive a force from the hood;
   wherein the bumper head is collapsible from an upright position, in which the bumper head extends through the opening of the housing, to a compressed position, in which the bumper head is substantially disposed within the interior chamber of the housing, when the force exceeds a predetermined magnitude;
   wherein the bumper head is configured to be resettable from the compressed position to the upright position; and
   wherein the housing further comprises at least one channel formed along at least a portion of the interior surface of the wall, and the bumper head further comprises at least one flange along at least a portion of the main body, the at least one flange being configured to fit within the at least one channel such that the bumper head is in the upright position.

2. The collapsible hood bumper of claim 1 further comprising a spring having a plurality of coils, the spring being attached to the main body of the bumper head and to the base of the housing, and being configured to allow the bumper head to be reset to the upright position from the compressed position.

3. The collapsible hood bumper of claim 2 wherein the spring is tapered such that each coil substantially fits within an adjacent coil when the bumper head is in the compressed position.

4. The collapsible hood bumper of claim 1 wherein at least a portion of the wall of the housing is tapered from the opening toward the base.

5. The collapsible hood bumper of claim 1 wherein the at least one channel of the housing is formed by at least one pair of ribs extending from the interior surface of the wall of the housing, the ribs being substantially parallel to each other.

6. The collapsible hood bumper of claim 1 wherein the at least one channel of the housing is formed in the wall of the housing.

7. The collapsible hood bumper of claim 1 wherein the housing further comprises an internal thread defined by the interior surface of the wall, and the bumper head further comprises a bumper thread configured to engage with the internal thread of the housing such that the bumper head is unscrewable from the compressed position to the upright position, the bumper thread being semi-rigid such that the bumper head is maintainable in the upright position and collapsible into the compressed position when the force applied exceeds the predetermined magnitude.

8. The collapsible hood bumper of claim 7 wherein the main body comprises a tool head opening configured to receive a tool head to unscrew the bumper head from the compressed position to the upright position.

9. The collapsible hood bumper of claim 1 wherein the bumper head further comprises a notch within the main body such that it may collapse inwardly toward the notch when the force is applied to the bumper head.

10. A vehicle comprising:
    an engine compartment;
    a hood configured to cover the engine compartment;
    at least one receiving hole located around the engine compartment and below the hood; and
    at least one collapsible hood bumper configured to contact the hood, the at least one collapsible hood bumper including:
       a housing having a wall, a base, and an opening defining an interior chamber, the wall having an interior surface and an exterior surface, the housing being adapted to engage with the at least one receiving hole such that the collapsible hood bumper is attached to the vehicle; and
       a bumper head having a main body, the bumper head being configured to receive a force from the hood;
    wherein the bumper head is collapsible from an upright position, in which the bumper head extends through the opening of the housing, to a compressed position, in which the bumper head is substantially disposed within the interior chamber of the housing, when the force exceeds a predetermined magnitude;
    wherein the bumper head is configured to be resettable from the compressed position to the upright position; and
    wherein the housing of the at least one collapsible hood bumper further comprises at least one channel formed along at least a portion of the interior surface of the wall, and the bumper head further comprises at least one flange along a portion of the main body, the at least one flange being configured to fit within the at least one channel such that the bumper head is in the upright position.

11. The vehicle of claim 10 wherein the at least one collapsible hood bumper further comprises a spring having a plurality of coils, the spring being attached to the main body of the bumper head and to the base of the housing, and being configured to allow the bumper head to be reset to the upright position from the compressed position.

12. The vehicle of claim 11 wherein the spring is tapered such that each coil substantially fits within an adjacent coil when the bumper head is in the compressed position.

13. The vehicle of claim 10 wherein at least a portion of the wall of the housing of the collapsible hood bumper is tapered from the opening toward the base.

14. The vehicle of claim 10 wherein the at least one channel of the housing of the collapsible hood bumper is formed by at least one pair of ribs extending from the interior surface of the wall of the housing, the ribs being substantially parallel to each other.

15. The vehicle of claim 10 wherein the at least one channel of the housing of the collapsible hood bumper is formed in the wall of the housing.

16. The vehicle of claim 10 wherein the housing of the collapsible hood bumper further comprises an internal thread defined by the interior surface of the wall, and the bumper head of the collapsible hood bumper further comprises a bumper thread configured to engage with the internal thread of the housing such that the bumper head is unscrewable from the compressed position to the upright position, the bumper thread being semi-rigid such that the bumper head is maintainable in the upright position and collapsible into the compressed position when the force applied exceeds the predetermined magnitude.

17. The vehicle of claim 10 wherein the bumper head of the collapsible hood bumper further comprises a notch within the main body such that it may collapse inwardly toward the notch when the force is applied to the bumper head.

18. The vehicle of claim 10 wherein the housing of the collapsible hood bumper further comprises an external thread defined by the exterior surface of the wall, the external thread being screwable into the at least one receiving hole of the vehicle.

19. A collapsible hood bumper for a vehicle having a hood, the collapsible hood bumper comprising:

a housing having a wall, a base, and an opening defining an interior chamber, the wall having an interior surface and an exterior surface; and a bumper head having a main body, the bumper head being configured to receive a force from the hood;

wherein the bumper head is collapsible from an upright position, in which the bumper head extends through the opening of the housing, to a compressed position, in which the bumper head is substantially disposed within the interior chamber of the housing, when the force exceeds a predetermined magnitude;

wherein the bumper head is configured to be resettable from the compressed position to the upright position;

wherein the housing further comprises an internal thread defined by the interior surface of the wall, and the bumper head further comprises a bumper thread configured to engage with the internal thread of the housing such that the bumper head is unscrewable from the compressed position to the upright position, the bumper thread being semi-rigid such that the bumper head is maintainable in the upright position and collapsible into the compressed position when the force applied exceeds the predetermined magnitude.

20. The collapsible hood bumper of claim 19, wherein the main body comprises a tool head opening configured to receive a tool head to unscrew the bumper head from the compressed position to the upright position.

\* \* \* \* \*